(12) United States Patent
Lee

(10) Patent No.: US 9,509,203 B1
(45) Date of Patent: Nov. 29, 2016

(54) STEPPING MOTOR

(71) Applicant: LG INNOTEK CO., LTD., Seoul (KR)

(72) Inventor: Su Hyoung Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/929,825

(22) Filed: Nov. 2, 2015

(30) Foreign Application Priority Data

Sep. 15, 2015 (KR) .................. 10-2015-0130277

(51) Int. Cl.
*H02K 37/00* (2006.01)
*H02K 7/06* (2006.01)
*H02K 5/22* (2006.01)

(52) U.S. Cl.
CPC ............ *H02K 37/00* (2013.01); *H02K 5/22* (2013.01); *H02K 7/06* (2013.01)

(58) Field of Classification Search
CPC ................ H02K 37/00–37/24; H02K 7/06
USPC .............................................. 310/20, 37, 80
IPC .................................................. H02K 007/06
See application file for complete search history.

(56) References Cited

U.S. PATENT DOCUMENTS

| | | | | |
|---|---|---|---|---|
| 4,496,865 A | * | 1/1985 | Allen | ............ G01B 7/02 310/12.19 |
| 4,831,290 A | * | 5/1989 | Clauss | ............ B23Q 1/58 29/41 |
| 5,499,547 A | * | 3/1996 | Nagai | ............ B23Q 5/38 108/143 |
| 2015/0303783 A1 | * | 10/2015 | Lee | ............ B60Q 1/076 362/526 |

FOREIGN PATENT DOCUMENTS

| | | |
|---|---|---|
| KR | 10-2009-0026473 A | 3/2009 |
| KR | 10-2014-0141853 A | 12/2014 |

OTHER PUBLICATIONS

Office Action dated May 10, 2016 in Korean Application No. 10-2015-0130277, filed Nov. 23, 2015.

* cited by examiner

*Primary Examiner* — Thomas Truong
(74) *Attorney, Agent, or Firm* — Saliwanchik, Lloyd & Eisenschenk

(57) ABSTRACT

Provided is a stepping motor which includes a bracket, a stator and a rotor disposed at the bracket, a lead screw of which both ends are fixed to the bracket, and rotating while coupled to the rotor, and a moving part coupled to the lead screw and guided along a side surface of the bracket to move, wherein guide protrusions are formed at both side surfaces of the moving part, the bracket includes guide slots formed at side surfaces and into which the guide protrusions are inserted, and the guide slots are formed to have heights higher than those of the guide protrusions, thereby providing an advantageous effect of minimizing friction contact.

6 Claims, 10 Drawing Sheets

STEPPING MOTOR

CROSS-REFERENCE TO RELATED APPLICATION

This application claims the benefit under 35 U.S.C. §119 of Korean Patent Application No. 10-2015-0130277, filed Sep. 15, 2015, which is hereby incorporated by reference in its entirety.

BACKGROUND

Field of the Invention

The present invention relates to a stepping motor, and more particularly, to a stepping motor in which a moving part such as a nut is provided at a lead screw.

Discussion of Related Art

A stepping motor is used to precisely control an extent of mechanical movement, and may be digitally controlled by a pulse. Due to this reason, the stepping motor is used for adjustments of a direction and an angle of a vehicular lamp or optical pickup of an optical disk driver which require precise control.

In a stepping motor, a lead screw inserted into a bracket rotates and straightly moves a moving part such as a nut, thereby controlling an extent of movement. However, since the moving part is coupled only by the lead screw, the moving part may be easily moved by an external impact and difficult to be precisely controlled.

To resolve this, a configuration in which a guide protrusion is formed at a moving part, and a guide structure which guides the guide protrusion is formed at the bracket is being suggested.

Here, a guide configuration such as a guide slot is configured to come in contact with both of top and bottom portions of the guide protrusion to prevent the moving part from moving.

However, such a guide configuration may be difficult to manage flatness of the guide slot and have a great friction load due to a great friction area between the guide slot and the guide protrusion.

BRIEF SUMMARY

Thus, to resolve the above problems, the present invention is directed to providing a stepping motor which minimizes a friction area of a guide protrusion of a moving part.

Problems to be resolved by the present invention are not limited to the above-mentioned problems, and those of ordinary skill in the art will be able to clearly understand other unmentioned problems from the description below.

To achieve the above aspect, the present invention may provide a stepping motor which includes a bracket, a stator and a rotor disposed at the bracket, a lead screw of which both ends are fixed to the bracket, and rotating while coupled to the rotor, and a moving part coupled to the lead screw and guided along a side surface of the bracket to move, wherein guide protrusions are formed at both side surfaces of the moving part, the bracket includes guide slots formed at side surfaces and into which the guide protrusions are inserted, and the guide slots are formed to have heights higher than those of the guide protrusions.

Preferably, the bracket may include a housing which accommodates the stator and the rotor, a support part disposed to face the housing, and a first connection bar and a second connection bar which connect the housing to the support part.

Preferably, the guide slots may be concavely formed at an inner surface of the first connection bar and an inner surface of the second connection bar.

Preferably, the guide protrusions may come in contact with guide surfaces formed on bottom surfaces of the guide slots and move.

Preferably, the guide protrusions formed at the both side surfaces of the moving part are formed as one pair of guide protrusions having different positions in a height direction, and the guide slots may include one pair of guide surfaces formed at different positions in the height direction and coming in contact with the guide protrusions.

Preferably, diameters of the pair of guide protrusions may be different from each other.

To achieve the above aspect, another invention may provide a stepping motor which includes a bracket, a stator and a rotor disposed at the bracket, a lead screw of which both ends are fixed to the bracket, and rotating while coupled to the rotor, and a moving part coupled to the lead screw and guided along a side surface of the bracket to move, wherein guide protrusions are formed at both side surfaces of the moving part, and the bracket includes guide surfaces formed at top surfaces of side surfaces to come in contact with the guide protrusions.

Preferably, the bracket may include a housing which accommodates the stator and the rotor, a support part disposed to face the housing, and a first connection bar and a second connection bar which connect the housing to the support part.

Preferably, the guide surfaces may be formed at a top surface of the first connection bar and a top surface of the second connection bar.

Preferably, the guide protrusions formed at the both side surfaces of the moving part are formed as one pair of guide protrusions having different positions in a height direction, and the guide surfaces may be formed at different positions in the height direction.

Preferably, diameters of the pair of guide protrusions may be different from each other.

To achieve the above aspect, still another invention may provide a stepping motor which includes a bracket, a stator and a rotor disposed at the bracket, a lead screw of which both ends are fixed to the bracket, and rotating while coupled to the rotor, and a moving part coupled to the lead screw and guided along a side surface of the bracket to move, wherein guide protrusions are formed at both side surfaces of the moving part, and the bracket includes guide surfaces formed at bottom surfaces of side surfaces to come in contact with the guide protrusions.

Preferably, the bracket may include a housing which accommodates the stator and the rotor, a support part disposed to face the housing, and a first connection bar and a second connection bar which connect the housing to the support part.

Preferably, the guide surfaces may be formed at a top surface of the first connection bar and a bottom surface of the second connection bar.

Preferably, the guide protrusions formed at the both side surfaces of the moving part are formed as one pair of guide protrusions having different positions in a height direction, and the guide surfaces may be formed at different positions in the height direction.

Preferably, diameters of the pair of guide protrusions may be different from each other.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, preferred embodiments of the present invention will be described in detail with reference to the attached drawings. Aspects, particular advantages, and new characteristics of the present invention will become more apparent from the detailed description and the preferred embodiments hereinafter which are related to the attached drawings. Also, terms or words used in the present specification and patent claims should not be limitingly construed as general or dictionary meanings, but should be construed as meanings and concepts corresponding to the technical spirit of the present invention based on a principle that an inventor may properly define a concept of a term to describe his or her invention in the best way. In addition, in describing the present invention, detailed description of related, known art that may make the gist of the present invention vague will be omitted.

Figure 1:
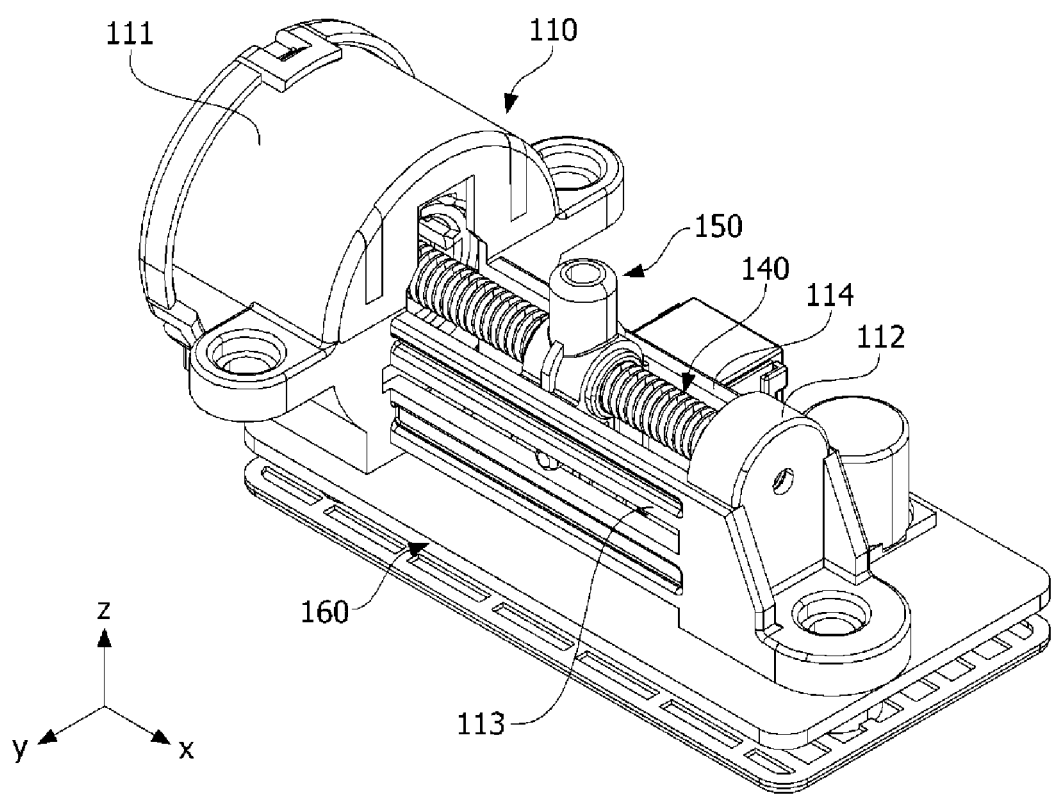
FIG. 1 is a view illustrating a stepping motor according to a first preferred embodiment of the present invention.

FIG. 1 is a view illustrating a stepping motor according to a first preferred embodiment of the present invention. FIG. 1 illustrates only main parts of the present invention to assist in clearly understanding the present invention conceptually, and as a result, various deformations are expected to be in FIG. 1, but the scope of the present invention need not be limited by particular shapes illustrated in FIG. 1.

A stepping motor of the present invention may include a bracket 110, a stator 120, a rotor 130, a lead screw 140, and a moving part 150.

The bracket 110 may include a housing 111, a support part 112, a first connection bar 113, and a second connection bar 114. Here, the housing 111, the support part 112, the first connection bar 113, and the second connection bar 114 may be differentiated in accordance with shapes and functional characteristics thereof and described, but may be one means vertically connected to each other. In addition, the bracket 110 may be implemented to have only one of the first connection bar 113 and the second connection bar 114.

A stator 120 and a rotor 130 may be disposed in the housing 111.

The support part 112 may be disposed to face the housing 111. The support part 112 plays a role of supporting a leading end of the lead screw 140. The support part 112 may include a bearing which rotatably supports the lead screw 140.

The first connection bar 113 and the second connection bar 114 perform a role of connecting the housing 111 to the support part 112. In addition, the first connection bar 113 and the second connection bar 114 play a role of guiding a movement of the moving part 150. That is, the first connection bar 113 and the second connection bar 114 include guide surfaces coming in contact with the moving part 150 to induce the moving part 150 to straightly move while interlocked with rotation of the lead screw 140.

The first connection bar 113 and the second connection bar 114 are disposed between the housing 111 and the support part 112, and are disposed to be spaced apart from each other to play a role of securing spaces for the lead screw 140 and the moving part 150 therein.

The stator 120 and the rotor 130 are disposed in the housing 111.

A coil may be wound around the stator 120. The coil wound around the stator 120 triggers an electrical interaction between the stator 120 and the rotor 130 and induces the rotation of the rotor 130. The lead screw 140 is coupled to the rotor 130, and the lead screw 140 rotates as the rotor 130 rotates.

The lead screw 140 may be coupled to the rotor 130, and the leading end thereof may be rotatably supported by the bearing included in the support part 112 of the bracket 110.

Figure 2:
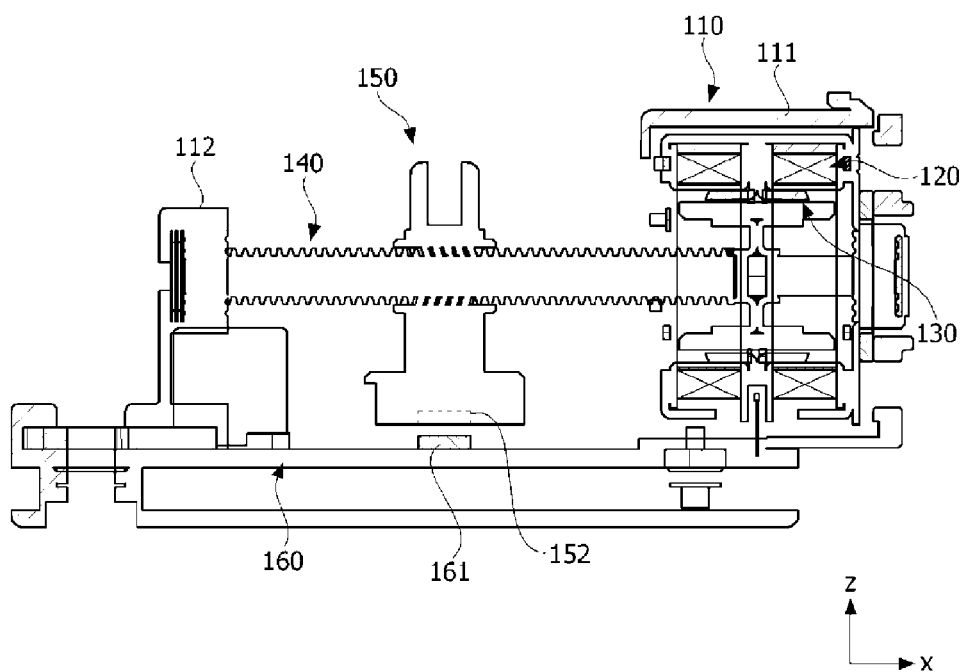
FIG. 2 is a cross-sectional view of the stepping motor illustrated in FIG. 1.

FIG. 2 is a cross-sectional view of the stepping motor illustrated in FIG. 1.

Referring to FIG. 1 and FIG. 2, the moving part 150 may be fastened to the lead screw 140 by a screw. Thus, when the lead screw 140 rotates, the moving part 150 straightly move along the lead screw 140. A substrate 160 may be disposed below the lead screw 140. A magnetic element 161 may be installed at the substrate 160. A magnet 152 may be installed at a bottom portion of the moving part 150, and the magnetic element 161 may be disposed on a moving path of the magnet 152. Here, the magnet 152 may have an N-pole magnet mounted at one side and an S-pole magnet mounted at the other side with respect to a longitudinal direction (an x-axis direction in FIG. 2) of the moving part 150.

The magnetic element 161 plays a role of detecting a change amount in a magnetic flux by the magnet 152 included in the moving part 150. The magnetic element 161 may be a Hall sensor (Hall IC) which changes a change in a magnetic field by voltage.

Figure 3:
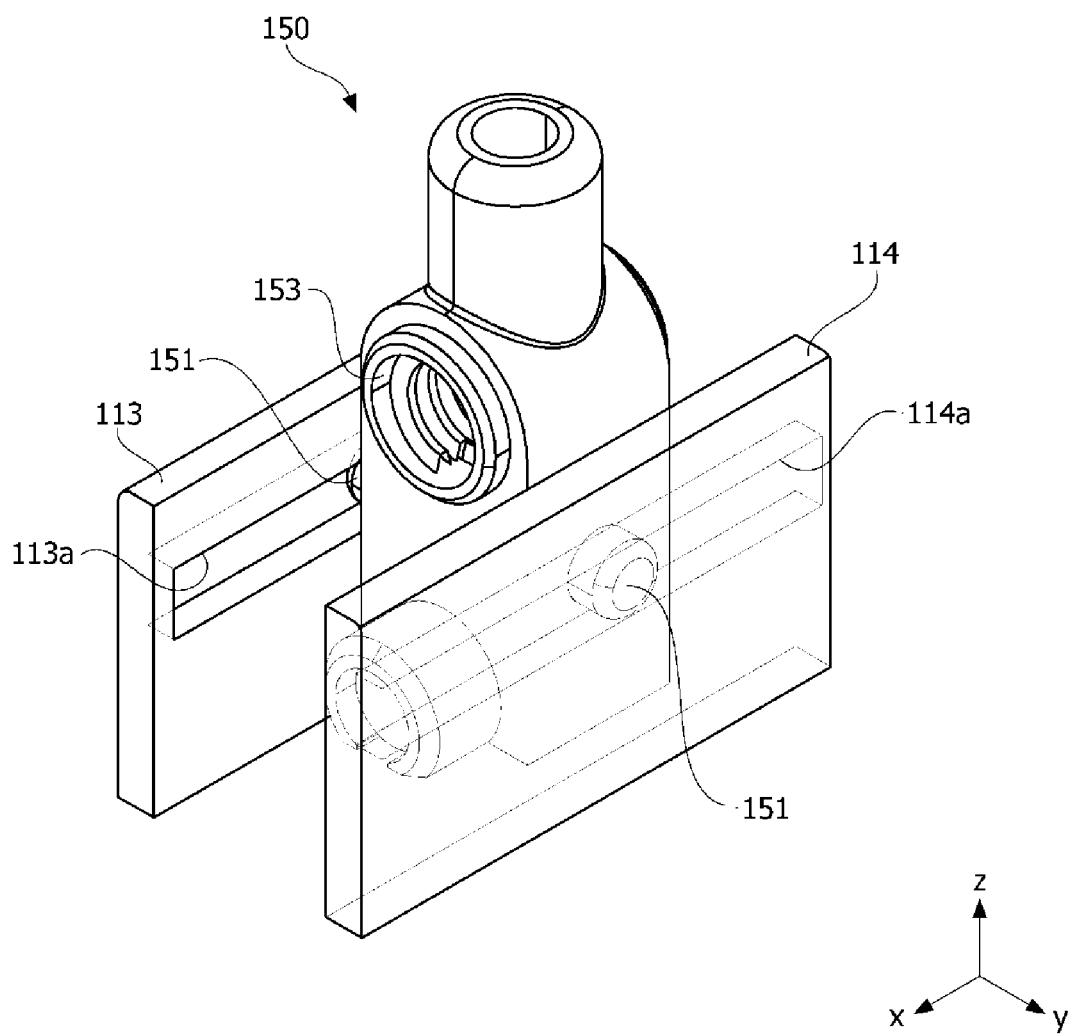
FIG. 3 is a view illustrating a moving part and guide slots of the stepping motor according to the first preferred embodiment of the present invention.

FIG. 3 is a view illustrating a moving part and guide slots of the stepping motor according to the first preferred embodiment of the present invention.

Referring to FIG. 3, the moving part 150 includes a hole 153 through which a front surface and a rear surface are formed to be communicated and into which the lead screw 140 is inserted. In addition, the moving part 150 may include guide protrusions 151 formed to protrude from both side surfaces.

The guide protrusions 151 may be formed in cylindrical shapes, or include a curved structure to minimize a frictional contact area.

The first connection bar 113 and the second connection bar 114 of the bracket 110 may include guide slots 113a and 114a into which the guide protrusions 151 are inserted. The guide slots 113a and 114a are concavely formed at inner surfaces of the first connection bar 113 and the second connection bar 114 facing each other and may be formed to extend in longitudinal directions of the first connection bar 113 and the second connection bar 114. The guide slots 113a and 114a play roles of restraining the moving part 150 from rotating and guiding the moving part 150 to straightly move at the same time when the guide protrusions 151 come in contact with guide slots 113a and 114a and the lead screw 140 rotates.

Meanwhile, the moving part 150 is a portion connected to a device. Here, the device may be a headlamp mounted on a vehicle. Specifically, the moving part 150 may be directly connected to a reflector of a headlamp, or be indirectly connected to a frame or the reflector of the headlamp through a connection member such as a link. As the moving part 150 straightly reciprocates, the headlamp may be swiveled and leveled to change a radiation direction of the lamp.

Figure 4:
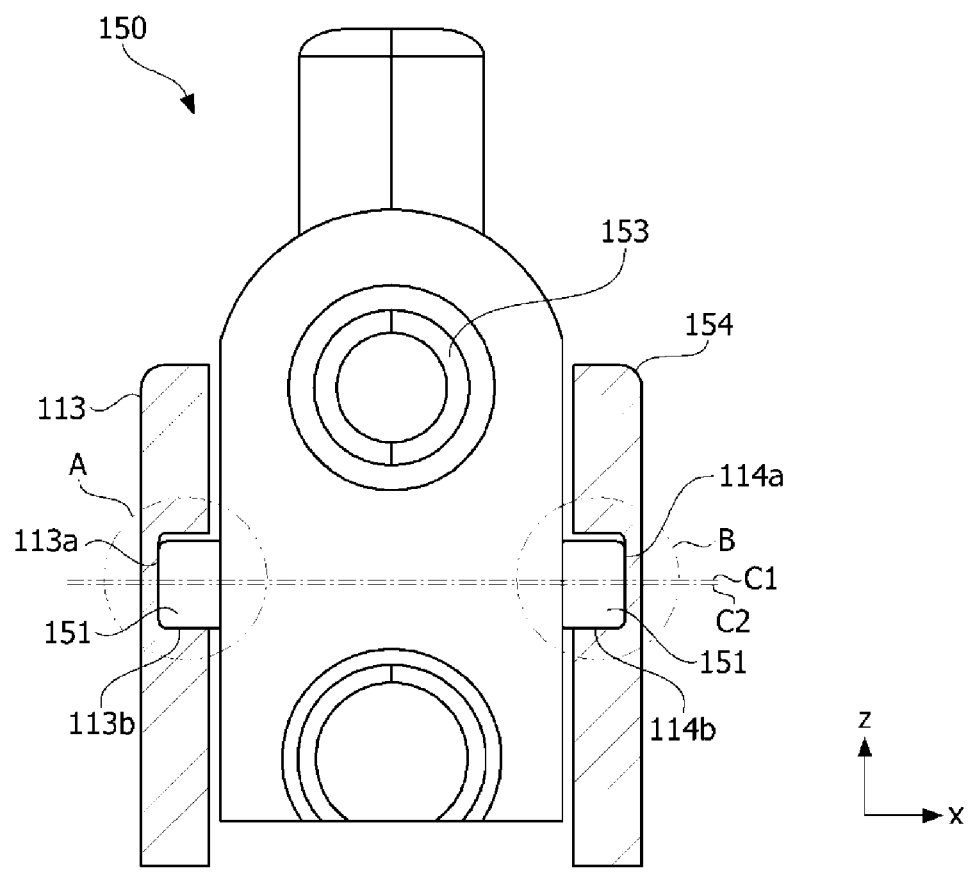
FIG. 4 is a front view of the moving part and the guide slots illustrated in FIG. 3.

FIG. 4 is a front view of the moving part and the guide slots illustrated in FIG. 3.

Referring to FIG. 3 and FIG. 4, positions in the height direction (z-axis direction) of the guide protrusions 151 which are formed to protrude from both side surfaces of the moving part 150 may be different from each other. That is, positions in the height direction (z-axis direction in FIG. 4) of horizontal reference lines C1 and C2 which horizontally pass through centers of the guide protrusions 151 may be different from each other.

In addition, sizes of the guide protrusions 151 may be formed to be different from each other. This is to prevent the moving part 150 from being reversely inserted into the lead screw 140 with respect to the longitudinal direction (x=axis direction in FIG. 4).

Figure 5:
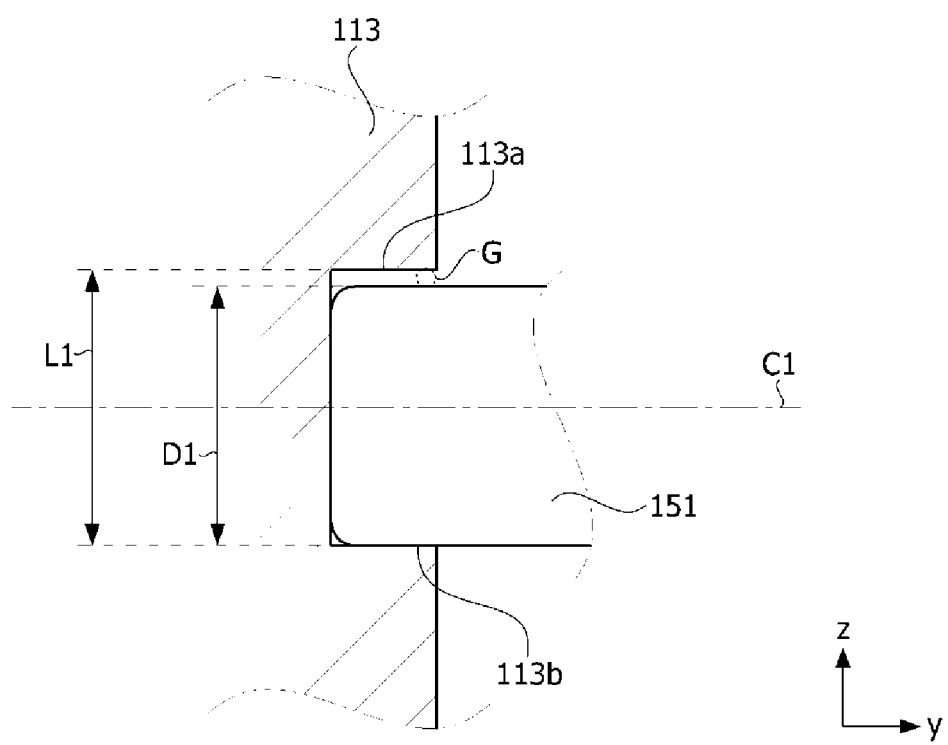
FIG. 5 is an enlarged view of region A in FIG. 4.

FIG. 5 is an enlarged view of region A in FIG. 4.

Referring to FIG. 5, a height L1 of the guide slot 113a may be formed greater than a diameter D1 of the guide protrusion 151. Also, a bottom surface of the guide slot 113a may be formed as a guide surface 113b which comes in contact with the guide protrusion 151. As a result, like G in FIG. 5, a top surface of the guide slot 113a and the guide protrusion 151 may be formed to be spaced apart from each other. Thus, there is an advantage of minimizing friction between the guide protrusion 151 and the guide slot 113a.

Figure 6:
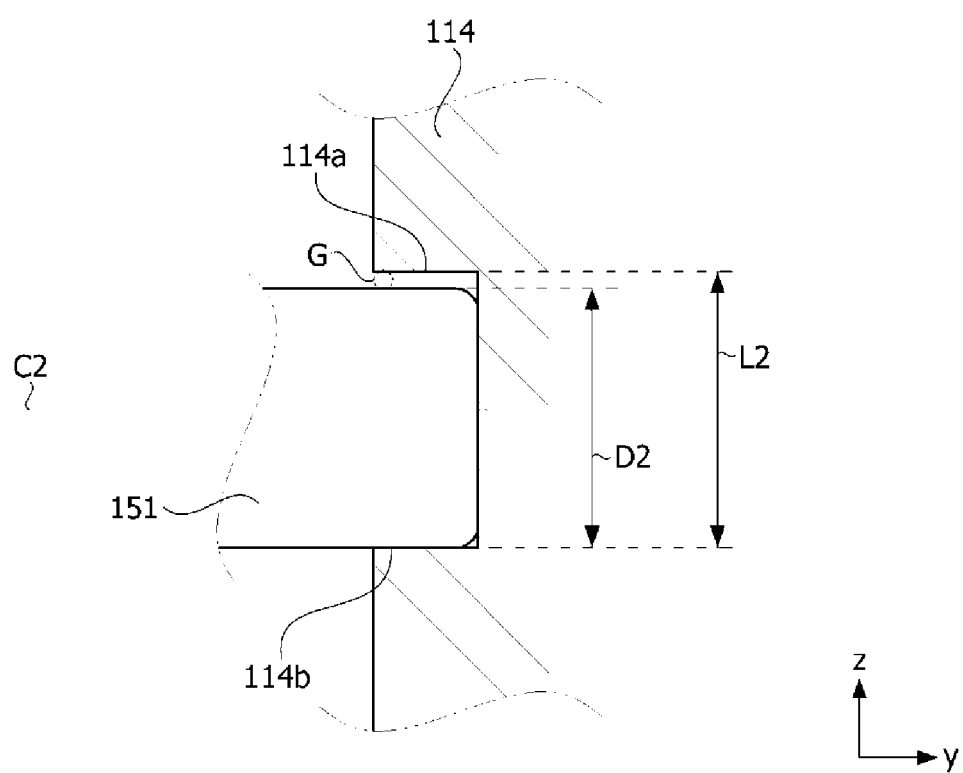
FIG. 6 is an enlarged view of region B in FIG. 4.

FIG. 6 is an enlarged view of region B in FIG. 4.

Referring to FIG. 6, a height L2 of the guide slot 114a may be formed greater than a diameter D2 of the guide protrusion 151. Also, a bottom surface of the guide slot 114a may be formed as a guide surface 114b which comes in contact with the guide protrusion 151. As a result, like G in FIG. 6, a top surface of the guide slot 114a and the guide protrusion 151 may be formed to be spaced apart from each other. Thus, there is an advantage of minimizing friction between the guide protrusion 151 and the guide slot 114a.

If tops and bottoms of the guide protrusions 151 all come in contact with the guide slots 113a and 114a, a clearance such as G in FIG. 5 and FIG. 6 is not secured, thus not only being difficult to assemble the moving part 150 to the guide slots 113a and (114a) but also causing an unsmooth movement of the moving part 150, thereby having a problem in which the stepping motor may stop.

Figure 7:
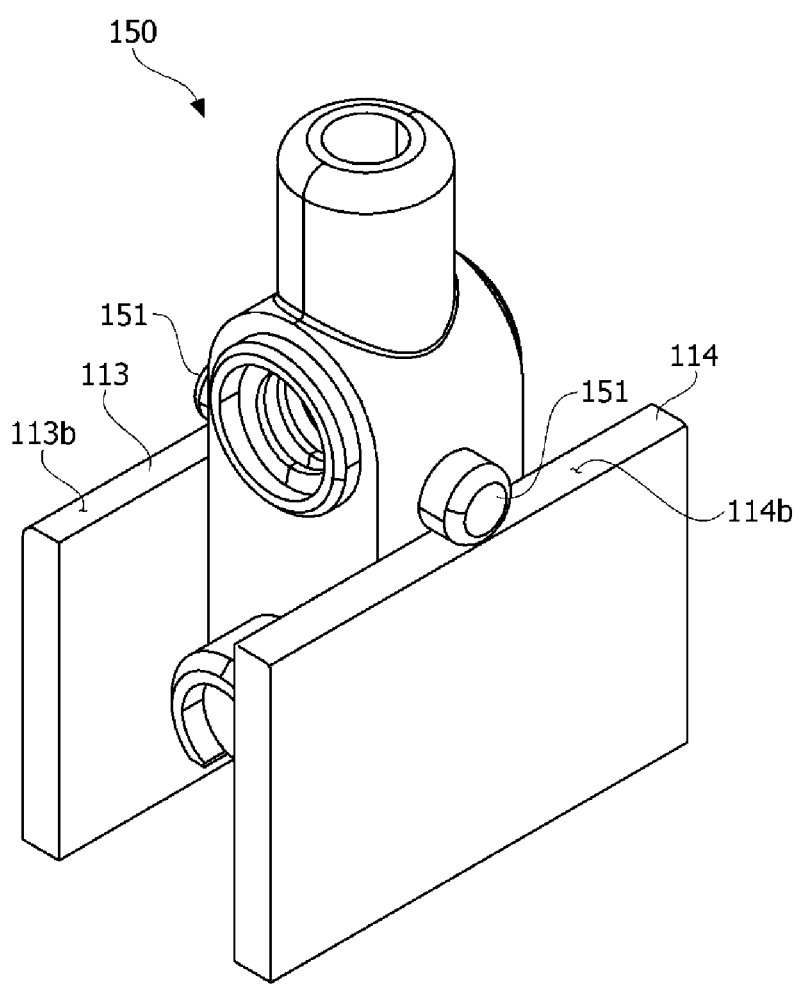
FIG. 7 is a view illustrating a moving part and guide slots of a stepping motor according to a second preferred embodiment of the present invention.
Figure 8:
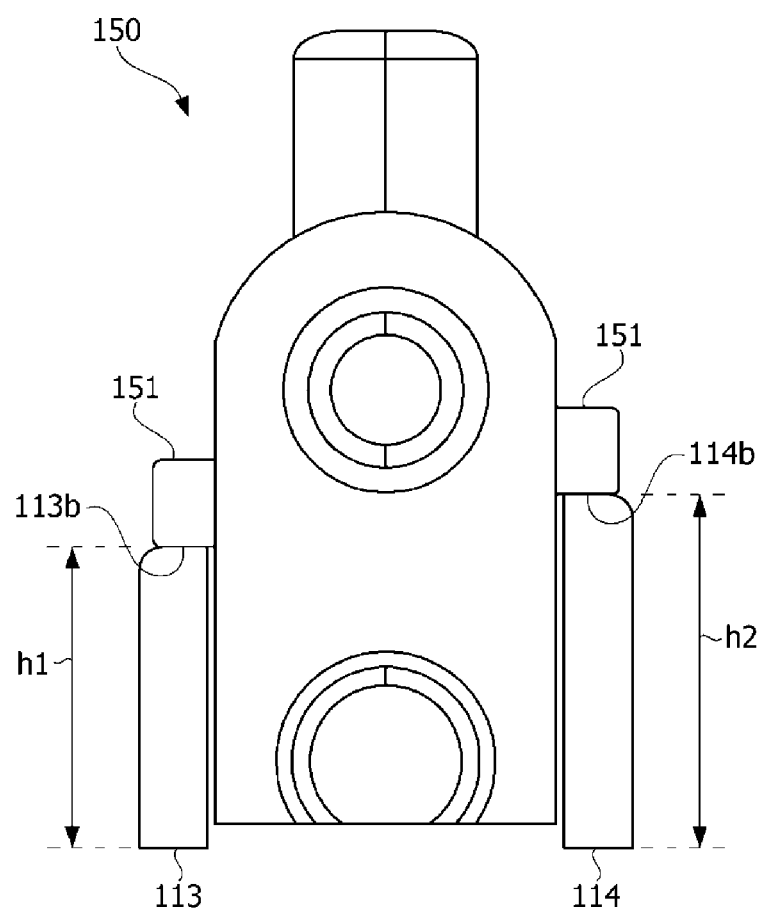
FIG. 8 is a front view of the moving part and the guide slots illustrated in FIG. 7.

FIG. 7 is a view illustrating a moving part and guide slots of a stepping motor according to a second preferred embodiment of the present invention, and FIG. 8 is a front view of the moving part and the guide slots illustrated in FIG. 7. FIG. 7 and FIG. 8 illustrate only main parts of the present invention to assist in clearly understanding the present invention conceptually, and as a result, various deformations are expected to be in FIG. 7 and FIG. 8, but the scope of the present invention need not be limited by particular shapes illustrated in FIG. 7 and FIG. 8.

Referring to FIG. 7 and FIG. 8, the guide protrusions 151 formed to protrude from both side surfaces of the moving part 150 may be included, and the guide surfaces 113b and 114b coming in contact with the guide protrusions 151 may be formed on a top surface of the first connection bar 113 and a top surface of the second connection bar 114.

Here, when a height from a bottom surface of the first connection bar 113 to a top surface formed as the guide surface 113b is called h1, and a height from a bottom surface of the second connection bar 114 to a top surface formed as the guide surface 114b is called h2, h1 and h2 may be formed to be different from each other.

A structure of the guide protrusions 151, the first connection bar 113, and the second connection bar 114 also has a configuration in which only bottoms of the guide protrusions 151 of the tops and bottoms thereof come in contact with the guide surfaces 113b and 114b, thereby having an advantage of minimizing friction among the guide protrusions 151 and the guide surfaces 113b and 114b.

Figure 9:
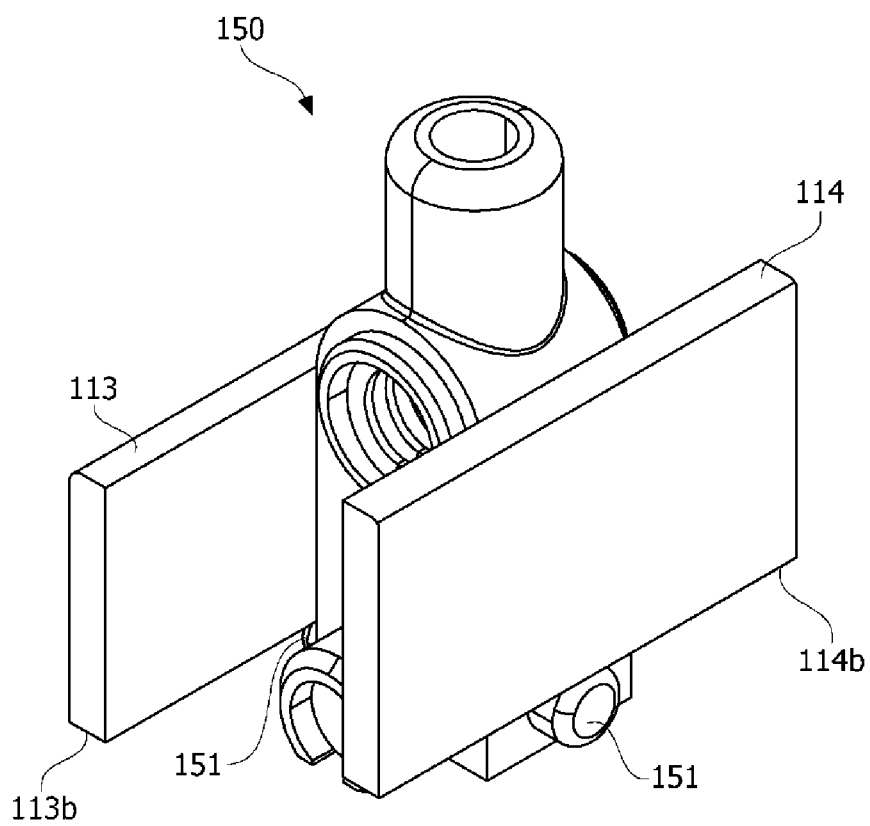
FIG. 9 is a view illustrating a moving part and guide slots of a stepping motor according to a third preferred embodiment of the present invention.
Figure 10:
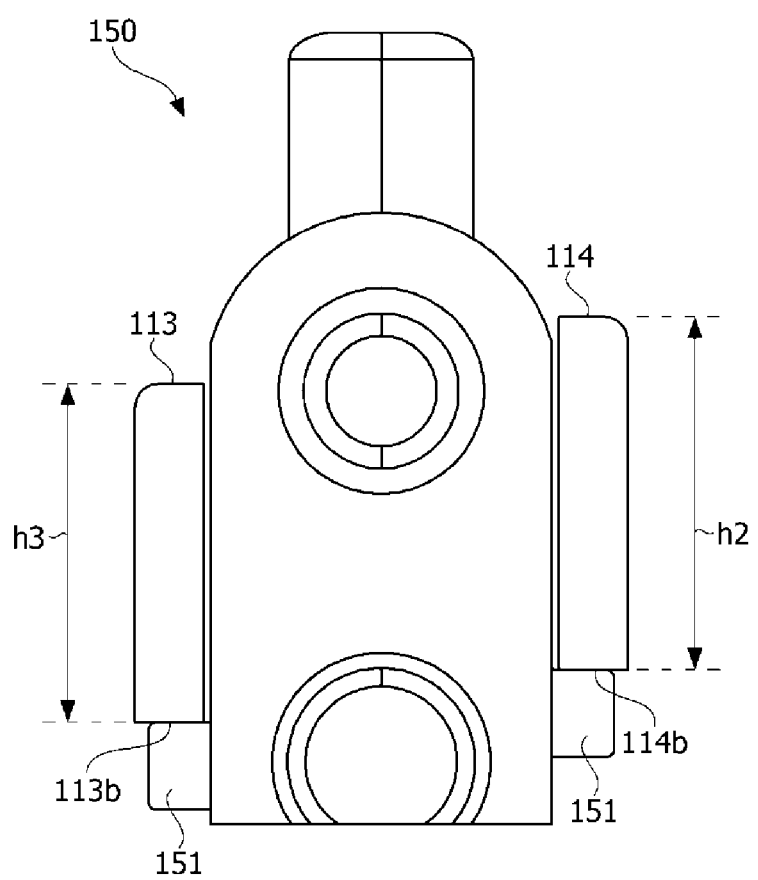
FIG. 10 is a front view of the moving part and the guide slots illustrated in FIG. 9.

FIG. 9 is a view illustrating a moving part and guide slots of a stepping motor according to a third preferred embodiment of the present invention; and FIG. 10 is a front view of the moving part and the guide slots illustrated in FIG. 9. FIG. 9 and FIG. 10 illustrate only main parts of the present invention to assist in clearly understanding the present invention conceptually, and as a result, various deformations are expected to be in FIG. 9 and FIG. 10, but the scope of the present invention need not be limited by particular shapes illustrated in FIG. 9 and FIG. 10.

Referring to FIG. 9 and FIG. 10, the guide protrusions 151 formed to protrude from both side surfaces of the moving part 150 may be included, and the guide surfaces 113b and 114b coming in contact with the guide protrusions 151 may be formed on a bottom surface of the first connection bar 113 and a bottom surface of the second connection bar 114.

Here, when a height from a top surface of the first connection bar 113 to a bottom surface formed as the guide surface 113b is called h3, and a height from a top surface of the second connection bar 114 to a bottom surface formed as the guide surface 114b is called h4, h3 and h4 may be formed to be different from each other.

A structure of the guide protrusions 151, the first connection bar 113, and the second connection bar 114 also has a configuration in which only tops of the guide protrusions 151 of the tops and bottoms thereof come in contact with the guide surfaces 113b and 114b, thereby having an advantage of minimizing friction among the guide protrusions 151 and the guide surfaces 113b and 114b.

FIG. 1 to FIG. 10 illustrate only main parts of the present invention to assist in clearly understanding the present invention conceptually, and as a result, various deformations are expected to be in FIG. 1 to FIG. 10, but the scope of the present invention need not be limited by particular shapes illustrated in FIG. 1 to FIG. 10.

Hereinabove, a stepping motor according to preferred embodiments of the present invention has been examined with reference to the attached drawings.

According to an embodiment of the present invention, guide surfaces which come in contact with guide protrusions of a moving part and guide the moving part are configured to come in contact with only one of top sides and bottom sides of the guide protrusions, thereby providing an advantageous effect of minimizing a frictional contact.

The above description is merely an illustrative description of the technical spirit of the present invention, and those of ordinary skill in the art to which the present invention pertains will be able to modify, change, and substitute the present invention in various ways without departing from the fundamental characteristics of the present invention. Thus, the disclosed embodiments and the attached drawings of the present invention are not for limiting the technical spirit of the present invention, but for describing the same, and the scope of the technical spirit of the present invention is not limited by the embodiments and the attached drawings. The scope of the present invention should be construed by the claims below, and all technical spirits within the equivalent scope with the claims below should be construed as being included in the scope of the present invention.

What is claimed is:

1. A stepping motor comprising:
a bracket;
a stator and a rotor disposed at the bracket;
a lead screw of which both ends are fixed to the bracket, and configured to rotate while coupled to the rotor; and
a moving part coupled to the lead screw and guided along a lateral side surface of the bracket so as to move linearly along the lead screw by rotation of the lead screw,
wherein guide protrusions are formed at both lateral side surfaces of the moving part, the bracket includes guide slots formed at lateral side surfaces thereof and into which the guide protrusions are respectively inserted, and each guide slot has a height that is higher than that of each guide protrusion.

2. The stepping motor according to claim 1, wherein the bracket comprises:
a housing configured to accommodate the stator and the rotor;
a support part disposed to face the housing; and
a first connection bar and a second connection bar configured to connect the housing to the support part.

3. The stepping motor according to claim 2, wherein the guide slots are concavely formed at an inner surface of the first connection bar and an inner surface of the second connection bar, respectively.

4. The stepping motor according to claim 3, wherein the guide protrusions come in contact with guide surfaces formed on bottom surfaces of the guide slots, respectively, and move.

5. The stepping motor according to claim 4, wherein:
the guide protrusions formed at the lateral side surfaces of the moving part are formed as one pair of guide protrusions having different positions in a height direction; and
the guide slots comprise one pair of guide surfaces formed at different positions in the height direction and coming into contact with the guide protrusions, respectively.

6. The stepping motor according to claim 5, wherein diameters of the pair of guide protrusions are formed to be different from each other.

* * * * *